(12) United States Patent
Kim

(10) Patent No.: US 7,864,263 B2
(45) Date of Patent: *Jan. 4, 2011

(54) THIN DISPLAY APPARATUS

(75) Inventor: Kwey-hyun Kim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/464,433

(22) Filed: May 12, 2009

(65) Prior Publication Data

US 2009/0219459 A1 Sep. 3, 2009

Related U.S. Application Data

(63) Continuation of application No. 10/413,213, filed on Apr. 15, 2003, now Pat. No. 7,545,453.

(30) Foreign Application Priority Data

Jul. 16, 2002 (KR) .............................. 2002-41614

(51) Int. Cl.
*G02F 1/1333* (2006.01)
(52) U.S. Cl. ....................................... 349/58
(58) Field of Classification Search ............... 349/58–61
See application file for complete search history.

(56) References Cited

U.S. PATENT DOCUMENTS

| | | | |
|---|---|---|---|
| 6,094,340 A | 7/2000 | Min | |
| 6,480,245 B1 | 11/2002 | Sakamoto et al. | |
| 6,490,438 B1 | 12/2002 | Wu | |
| 6,542,206 B1 | 4/2003 | Saito | |
| 6,747,713 B1 | 6/2004 | Sato | |
| 7,545,453 B2 * | 6/2009 | Kim | 349/58 |

(Continued)

FOREIGN PATENT DOCUMENTS

EP   0 880 049   11/1998

(Continued)

*Primary Examiner*—Dung T. Nguyen
(74) *Attorney, Agent, or Firm*—Staas & Halsey LLP

(57) ABSTRACT

A display apparatus includes an LCD panel, a PCB assembly placed behind the LCD panel and supplying electric current to the LCD panel, an LCD frame provided around the LCD panel, a plurality of first combining parts formed on peripheral sides of the LCD frame, and a plurality of second combining parts formed on the plane of the LCD frame. A front cover is placed in front of the LCD panel, covering edges of the LCD panel and is combined to one of the first and second combining parts. A rear cover is placed behind the LCD panel, accommodating the PCB assembly, and is combined to the other one of the first and second combining parts. With this configuration, the present invention provides a display apparatus which minimizes a space for installation, carriage and storage, has a slim and compact appearance, and prevents an illusion that a display part of an LCD panel is relatively small. Further, the present invention provides a display apparatus which need not comprise some components such as a panel supporting member and a PCB cover, thereby being easily and quickly assembled. Furthermore, the present invention provides a display apparatus of which front and rear covers are made of a conductive metal, so that an LCD panel and a PCB assembly are effectively protected from EMI.

17 Claims, 7 Drawing Sheets

U.S. PATENT DOCUMENTS

| | | |
|---|---|---|
| 2001/0050732 A1 | 12/2001 | Okamoto et al. |
| 2002/0057237 A1 | 5/2002 | Lin et al. |
| 2002/0080297 A1 | 6/2002 | Sung |

FOREIGN PATENT DOCUMENTS

| | | |
|---|---|---|
| EP | 1150199 | 10/2001 |
| JP | 11-133418 | 5/1999 |
| JP | 2000-132279 | 5/2000 |
| KR | 2000-34179 | 6/2000 |
| KR | 2000-38536 | 7/2000 |
| KR | 2001-10564 | 2/2001 |
| KR | 2001-64891 | 7/2001 |

* cited by examiner

THIN DISPLAY APPARATUS

CROSS-REFERENCE TO RELATED APPLICATIONS

This application is a continuation application of U.S. application Ser. No. 10/413,213, filed Apr. 15, 2003 now U.S. Pat. No. 7,545,453, the disclosure of which is incorporated herein by reference. This application claims the benefit of Korean Patent Application No. 2002-41614, filed Jul. 16, 2002, in the Korean Intellectual Property Office, the disclosure of which is incorporated herein by reference.

BACKGROUND OF THE INVENTION

1. Field of the Invention

The present invention relates to a display apparatus, and more particularly, to a display apparatus improved in a combining structure of front and rear covers supporting an LCD (liquid crystal display) panel.

2. Description of the Related Art

A display apparatus collectively refers to monitors for TV sets or computer systems, and includes a CRT (cathode ray tube) monitor, an LCD (liquid crystal display) monitor, etc.

The CRT monitor employs the principle that when various electron beams according to the intensity of picture signals strikes a monochrome or RGB (red, green, blue) fluorescent material coated on a CRT panel, light having different brightness and various colors is generated. The CRT monitor is widely used because of an economic price and a good display quality thereof, but it occupies a relatively large space because of the bulky size thereof.

The LCD monitor employs the principle that electric current passed through a liquid crystal varies a molecular arrangement of the liquid crystal so as to block the passage of light. The LCD monitor is thin in the thickness thereof, but is expensive in price and poor in display quality, in comparison with the CRT monitor.

Hereinafter, the display apparatus having an LCD panel will be described by way of example.

A conventional display apparatus, as shown in FIGS. 1 and 2, comprises a base part 110 seated on a predetermined installation surface, an LCD panel 140 displaying a picture thereon, a panel supporting member 142 supporting the LCD panel 140, a PCB (printed circuit board) assembly 144 supported by a PCB cover 146 and supplying an electric current to the LCD panel 140, a front cover 120 placed in front of the LCD panel 140, and a rear cover 130 placed behind the LCD panel 140 and combined with the front cover 120.

On the rear of the front cover 120 are formed a plurality of first bosses 118 and a plurality of second bosses 119 adjacent to the first bosses 118. Each first boss 118 has a female thread and is combined with a first screw 135 passed through a first through hole 133 formed on the rear cover 130. Further, each second boss 119 has a female thread and is combined with a second screw 141 passed through a second through hole 145 formed on a side flange part 143 of the panel supporting member 142.

With this configuration, the conventional display apparatus is assembled as follows. First, the LCD panel 140 is supported by the panel supporting member 142, with an effective surface of the LCD panel 140 facing forward. Thereafter, the second through holes 145 formed on the side flange parts 143 of the panel supporting member 142 are aligned with the second bosses 119 formed on the rear of the front cover 120. Thereafter, the second screws 141 are coupled with the second bosses 119 through the second through holes 145, so that the panel supporting member 142 is fastened to the front cover 120, with the LCD panel 140 being disposed therebetween. Thereafter, the PCB assembly 144 is installed to the back of the panel supporting member 142, and covered with the PCB cover 146 which is combined to the back of the panel supporting member 142. Thereafter, the first through holes 133 formed on the rear cover 130 are aligned with the first bosses 118 formed on the rear of the front cover 120. Thereafter, the first screws 135 are coupled with the first bosses 118 through the first through holes 133, so that the conventional display apparatus is completely assembled.

However, in the conventional display apparatus, the front panel 120 needs a space to which the panel supporting member 142 and the rear cover 130 are fastened, and the needed space causes the width "A" of a front face 124 of the front cover 120 to be increased. Further, in the conventional display apparatus, the panel supporting member 142, the LCD panel 140, the PCB cover 146, and the PCB assembly 144 are all provided between the front and rear covers 120 and 130, and the panel supporting member 142 and the PCB cover 146 causes the thickness "B" of the display apparatus to be increased.

Herein, the more the width "A" of the front face 124 and the thickness "B" of the display apparatus are increased, the more a space is needed for installing, carrying, storing the display apparatus. Further, the conventional display apparatus is not adapted for a slim and compact design. Further, the enlarged front face 124 gives an illusion that the effective surface of the LCD panel 140 looks relatively small.

Moreover, because the panel supporting member 142 supporting the LCD panel 140 and the PCB cover 146 covering the PCB assembly 144 are separately provided between the front and rear covers 120 and 130, it is cumbersome and takes a relatively long time to assemble the display apparatus.

SUMMARY OF THE INVENTION

Accordingly, it is an aspect of the present invention to provide a display apparatus which minimizes a space for installation, carriage and storage, has a slim and compact appearance, and prevents an illusion that a display part of an LCD panel looks relatively small.

Another aspect of the present invention is to provide a display apparatus which is easily and quickly assembled.

Additional aspects and/or advantages of the invention will be set forth in part in the description which follows and, in part, will be obvious from the description, or may be learned by practice of the invention.

The foregoing and/or other aspects of the present invention are achieved by providing a display apparatus comprising an LCD panel, a PCB assembly placed behind the LCD panel and supplying electric current to the LCD panel, further comprising an LCD frame provided around the LCD panel, and including a plurality of first combining parts formed on peripheral sides of the LCD frame, and a plurality of second combining parts formed on the plane of the LCD frame; a front cover placed in front of the LCD panel, covering edges of the LCD panel, and combined to one of the first and second combining parts; and a rear cover placed behind the LCD panel, accommodating the PCB assembly, and combined to the other one of the first and second combining parts.

The front cover is combined to the first combining parts, and the rear cover is combined to the second combining parts.

Each first combining part is formed with a female thread, the front cover is formed with a plurality of through holes in correspondence to the first combining parts, and the rear cover is formed with a plurality of boss parts each having a female thread in correspondence to the second combining parts.

The PCB assembly is combined to the rear cover. The rear cover is made of a conductive metal. The front cover is made of injection-molded plastic materials or a conductive metal.

BRIEF DESCRIPTION OF THE DRAWINGS

These and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
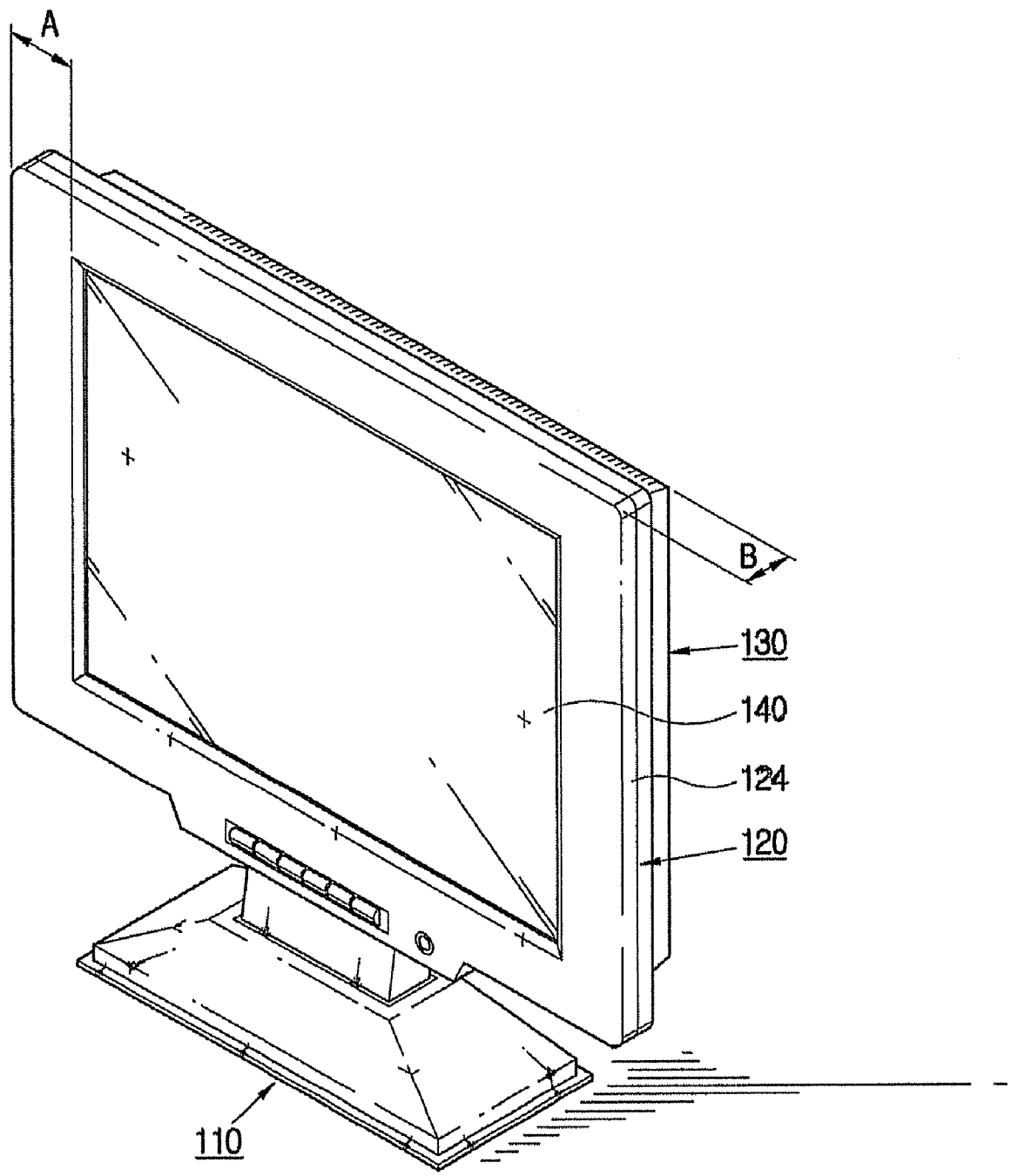
FIG. 1 is a perspective view of a conventional display apparatus.
Figure 2:
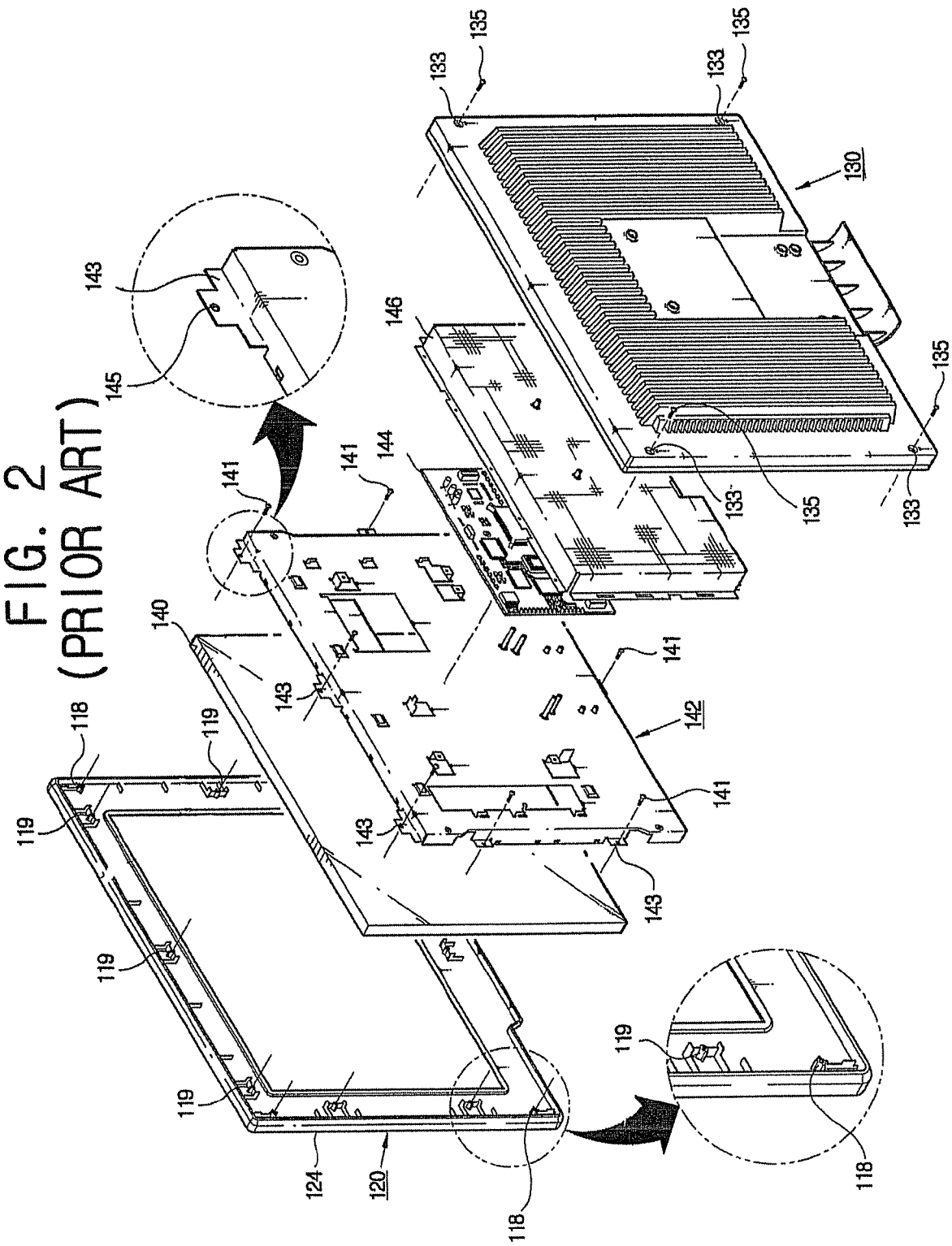
FIG. 2 is an exploded perspective view of the display apparatus of FIG. 1.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
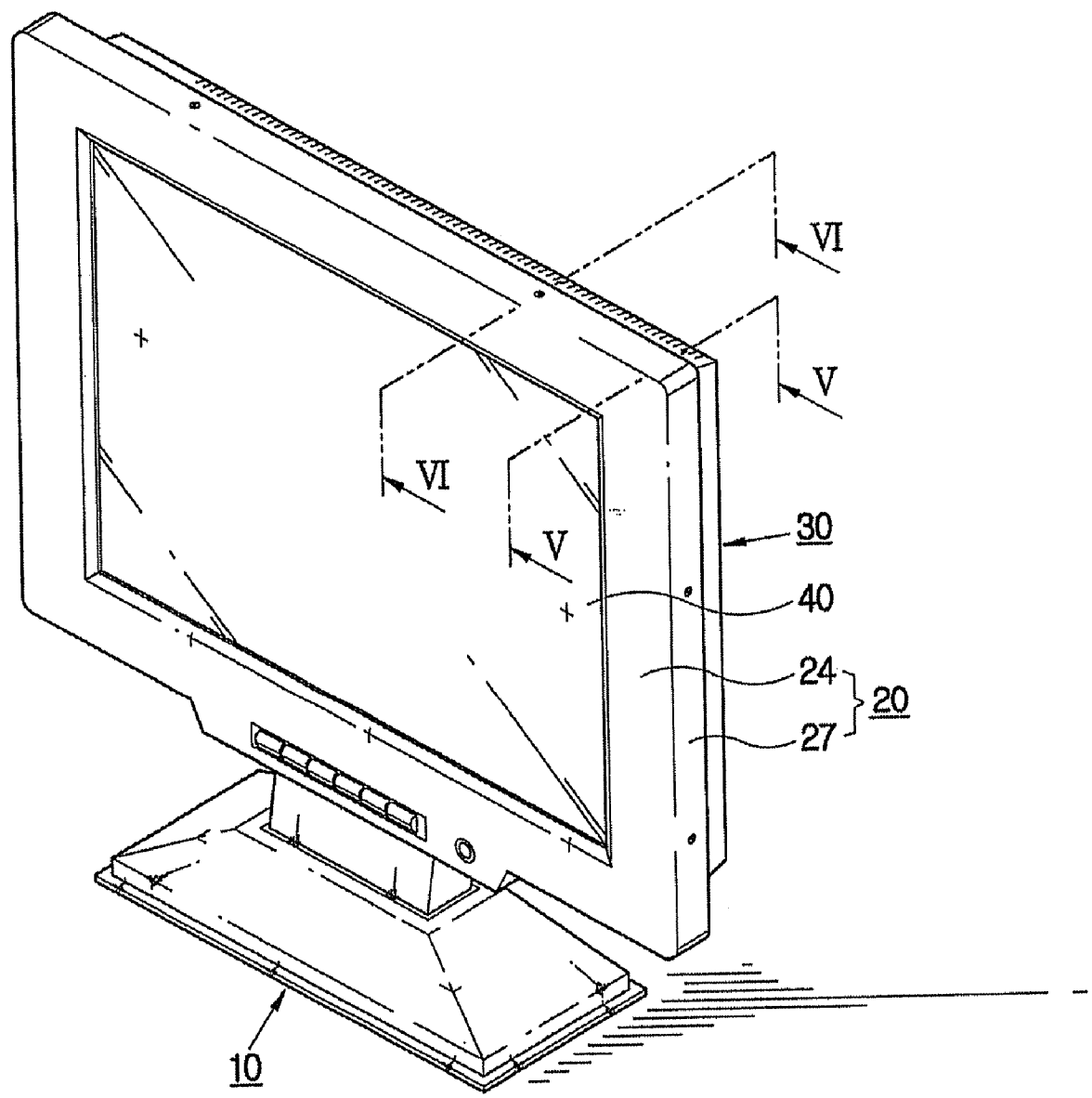
FIG. 3 is a perspective view of a display apparatus according to a first embodiment of the present invention.
Figure 4:
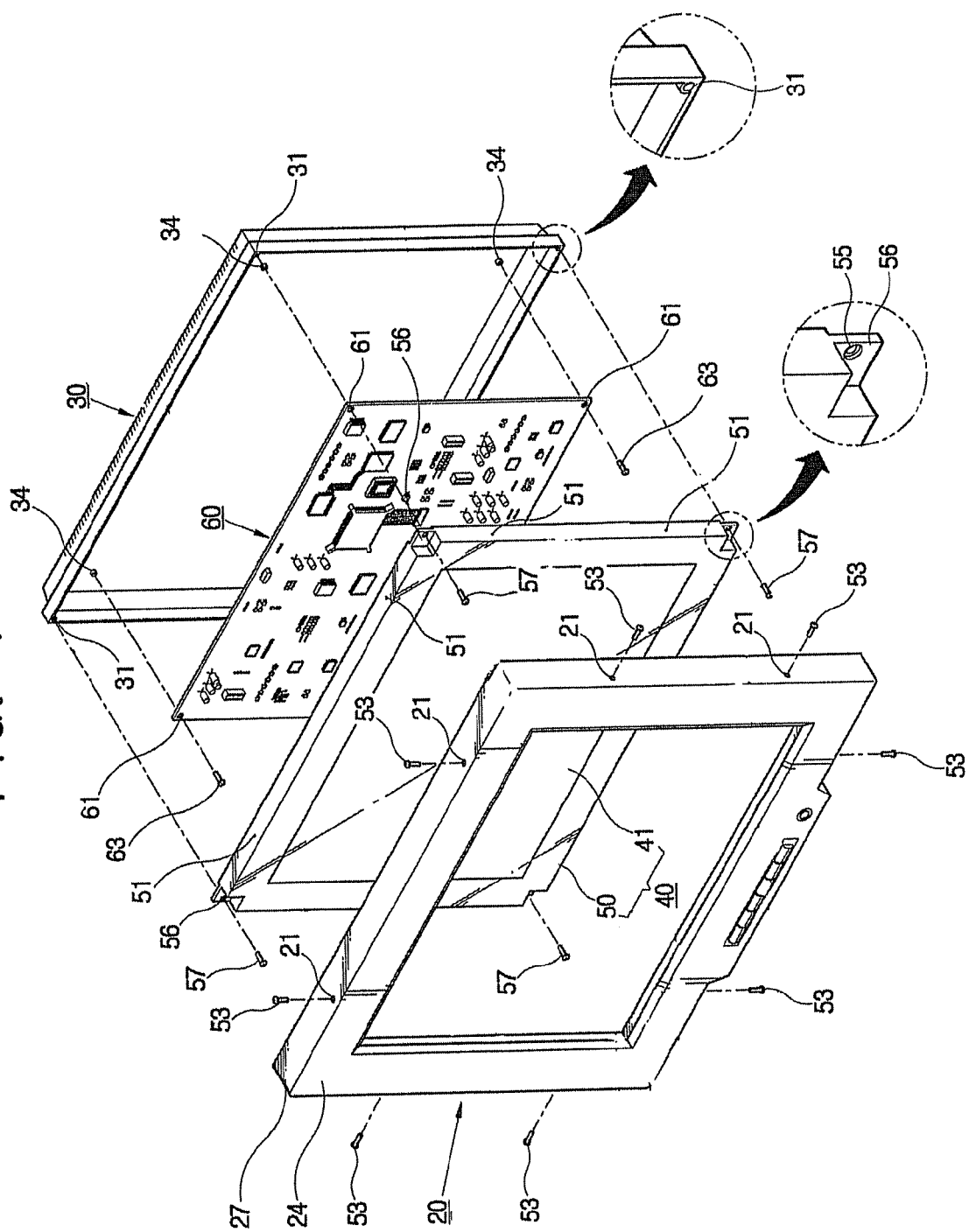
FIG. 4 is an exploded perspective view of the display apparatus of FIG. 3.

A display apparatus according to a first embodiment of the present invention, as shown in FIGS. 3 and 4, comprises a base part 10 seated on a predetermined installation surface such as a desk, a wall, etc., an LCD panel 40 having a display part 41 displaying a picture thereon, a PCB assembly 60 placed behind the LCD panel 40 and supplying electric current to the LCD panel 40, a front cover 20 placed in front of the LCD panel 40 and covering edges of the LCD panel 40, and a rear cover 30 combined to the rear of the LCD panel 40 and accommodating the PCB assembly 60.

The base part 10 is placed in a lower part of the display apparatus, and combined to at least one of the front cover 20 and the rear cover 30, thereby supporting the LCD panel 40, the front cover 20, the rear cover 30, etc.

The LCD panel 40 varies the molecular arrangement of the liquid crystal so as to block the passage of light when the electric current is supplied from the PCB assembly 60 to a liquid crystal, thereby displaying a picture. Further, the LCD panel 40 includes the display part 41 displaying a picture thereon, and an LCD frame 50 provided in the edges of the LCD panel 40 and preventing the liquid crystal from leakage.

The LCD frame 50 includes a plurality of first combining parts 51 formed on peripheral sides of the LCD frame 50 and each having a female thread, and a plurality of second combining parts 55 formed through corners of the LCD frame 50. Herein, the LCD frame 50 is generally made of a conductive metal so as to protect the LCD panel 40 from EMI (electromagnetic interference).

Two first combining parts 51 are provided on each peripheral side of the LCD frame 50, and each first combining part 51 is coupled with a first screw 53 (to be described later) through a first through hole 21 (to be described later) of the front cover 20.

The second combining part 55 is formed in a combining supporting part 56 formed at every corner of the LCD frame 50, in the direction perpendicular to the surface of the LCD panel 40, so that a second screw 57 (to be described later) is passed through each second combining part 55 and coupled with a boss part 31 (to be described later) of the rear cover 30, respectively.

The front cover 20 includes a front face 24 having a front opening through which the display part 41 of the LCD panel 40 is exposed, and a skirt part 27 bent from each edge of the front face 24 toward the rear cover 30. The front face 24 covers the LCD frame 50. The skirt part 27 is formed with the plurality of through holes 21 corresponding to the first combining parts 51 of the LCD frame 50. Herein, it is preferable that the front cover 20 is manufactured by die-casting or compression molding magnesium alloy. However, the front cover 20 may be manufactured by die-casting or compression molding aluminum, or by injection molding plastic materials.

The rear cover 30 includes the plurality of boss parts 31 formed as a single body with the rear cover 30, provided in correspondence to the second combining parts 55 of the LCD frame 50, and each having a female thread, and a plurality of PCB boss parts 34 provided in correspondence to second through holes 61 (to be described later) of the PCB assembly 60 and each having a female thread to be coupled with a third screw 63. Herein, it is preferable that the rear cover 30 is manufactured by die-casting of the alloyed magnesium materials so as to protect the LCD panel 40 and the PCB assembly 60 from the EMI. However, the rear cover 30 may be manufactured by molding the conductive magnesium alloy, or by compression molding a conductive steel sheet such as a tin-zinc plated steel sheet, a cold rolled steel sheet, etc.

The PCB assembly 60 is placed behind the LCD panel 40, supplies electric current to the LCD panel 40, and is provided with the plurality of second through holes 61 through which the third screws 63 pass and are coupled with the PCB boss parts 34 of the rear cover 30 so as to fasten the PCB assembly 60 to the rear cover 30.

With this configuration, the process of assembling the display apparatus according to the first embodiment of the present invention will be described hereinbelow, referring to FIGS. 5 and 6.

First, the third screws 63 pass through the second through holes 61 of the PCB assembly 60 and are coupled with the PCB boss parts 34 of the rear cover 30. Thereafter, the second screws 57 pass through the second combining parts 55 of the LCD frame 50 and are coupled with the boss parts 31 of the rear cover 30, with the display part 41 of the LCD panel 40 facing forward (see FIG. 5). Thereafter, the first screws 53 pass through the first through holes 21 formed on the skirt part 27 of the front cover 20 and are coupled with the first combining parts 51 of the LCD frame 50, with the LCD panel 40 being fitted on the skirt part 27 (see FIG. 6). Thereafter, the base part 10 is combined to at least one of the front cover 20 and the rear cover 30 (this is not illustrated), so that the display apparatus according to the first embodiment of the present invention is completely assembled.

Figure 5:
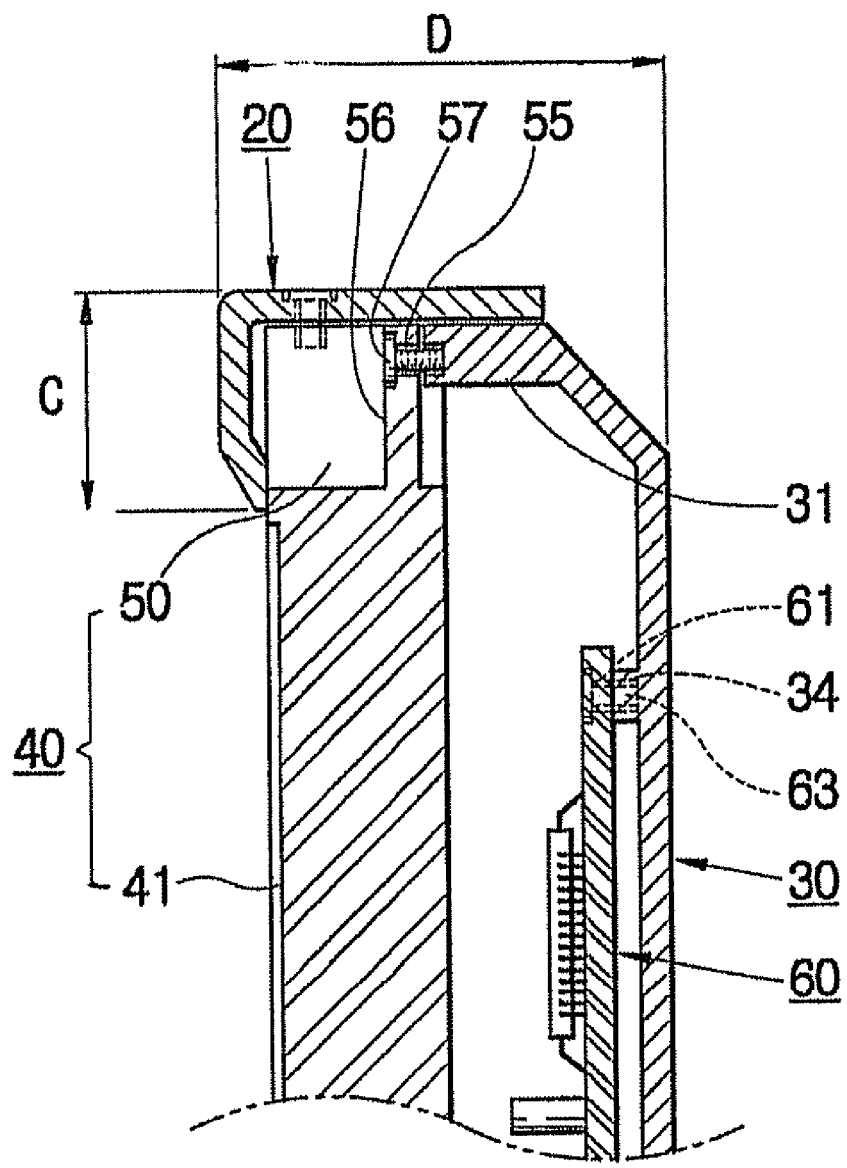
FIG. 5 is a partially sectional view of the display apparatus, taken along line V-V in FIG. 3.
Figure 6:
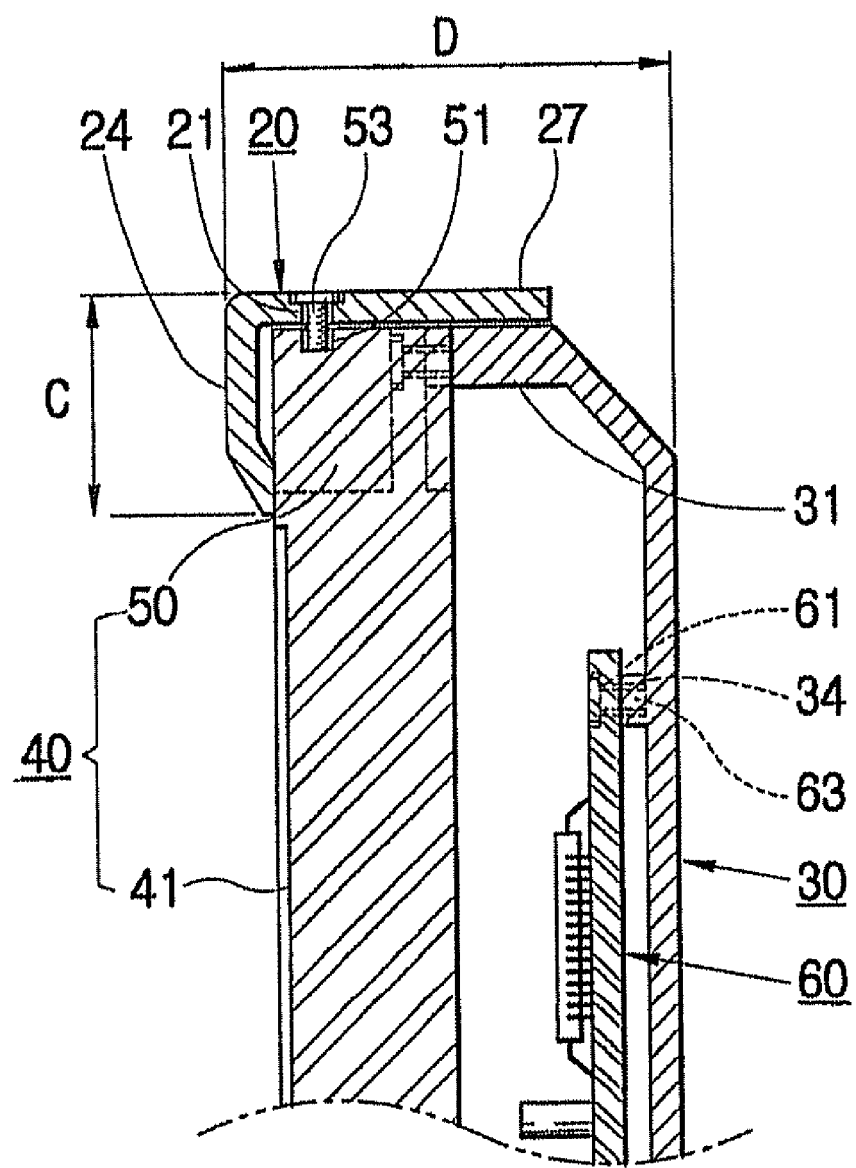
FIG. 6 is a partially sectional view of the display apparatus, taken along line VI-VI in FIG. 3.

Thus, as shown in FIGS. 5 and 6, the skirt part 27 of the front cover 20 is directly combined with the LCD frame 50 of the LCD panel 40, so that the width "C" of the front face 24 of the front cover 20 is decreased. Further, only the LCD panel 40 and the PCB assembly 60 are provided between the front and rear covers 20 and 30, so that the thickness "D" of the display apparatus is decreased. Moreover, there is no necessity for some components such as a panel supporting member and a PCB cover, so that the display apparatus can be easily and quickly assembled. Furthermore, the front and rear covers 20 and 30 are made of the conductive metal, so that the LCD panel 40 and the PCB assembly 60 are effectively protected from the EMI.

Figure 7:
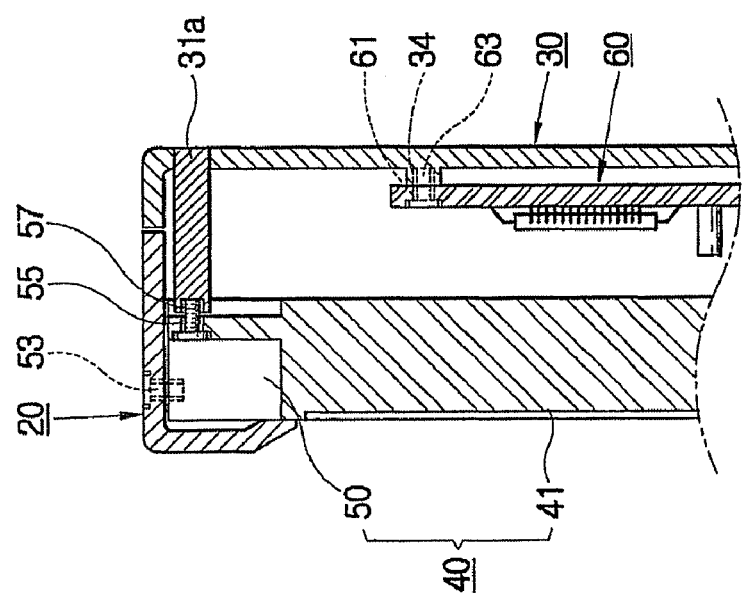
FIG. 7 is a partially sectional view of a display apparatus according to a second embodiment of the present invention.

FIG. 7 is a partially sectional view of a display apparatus according to a second embodiment of the present invention. According to the second embodiment, as compared with the boss part 31 formed in the rear cover 30 in the first embodiment, there is provided a stud 31*a* having a female thread to be coupled with the second combining part 55 of the LCD frame 50. Herein, it is preferable that the stud 31*a* is made of conductive metal.

On the other hand, if the boss part 31 of the rear cover 30 according to the first embodiment is worn or broken, the rear cover 30 may need to be replaced in its entirety, but if the stud 31*a* of the rear cover 30 according to the second embodiment is worn or broken, only the stud 31*a* can be replaced without replacing the entire rear cover 30. That is, the second embodiment has certain improvements in comparison with the first embodiment.

As described above, the display apparatus according to the present invention comprises the front cover placed in front of the LCD panel, and the rear cover placed behind the LCD panel, and the front and rear covers are directly combined to the LCD frame provided in the edges of the LCD panel, thereby decreasing a space for installing, carrying and storing the display apparatus, making the outer appearance thereof slim and compact, and preventing an illusion that the display part of the LCD panel is relatively small. Further, the display apparatus according to the present invention need not comprise some components such as a panel supporting member and a PCB cover, so that the display apparatus can be easily and quickly assembled. Furthermore, the front and rear covers are made of conductive metal, so that the LCD panel and the PCB assembly are effectively protected from the EMI.

As described above, the present invention provides a display apparatus which minimizes a space for installation, carriage and storage, has a slim and compact appearance, and prevents an illusion that a display part of an LCD panel is relatively small.

Further, the present invention provides a display apparatus which need not comprise some components such as a panel supporting member and a PCB cover, thereby being easily and quickly assembled.

Furthermore, the present invention provides a display apparatus of which front and rear covers are made of a conductive metal, so that an LCD panel and a PCB assembly are effectively protected from EMI.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus, comprising:
    an LCD panel;
    a front cover located in front of the LCD panel;
    a rear cover assembly located behind the LCD panel; and
    an LCD frame surrounding the LCD panel at a periphery thereof and including a plurality of corner combining holes formed at four corners of the LCD frame and combined to edges of at least one of the front cover and the rear cover, the four corners of the LCD frame being recessed with thin thickness,
    wherein sides of the front cover surround sides of the rear cover when the front cover and the rear cover are combined.

2. The display apparatus according to claim 1, wherein the LCD frame further includes a plurality of side combining holes formed on the peripheral sides of the LCD frame.

3. The display apparatus according to claim 2, wherein the front cover is combined to the LCD frame through the side combining holes.

4. The display apparatus according to claim 2, wherein the side combining holes are provided for a stud coupling.

5. The display apparatus according to claim 1, wherein the rear cover is combined to the LCD frame through the corner combining holes.

6. The display apparatus according to claim 1, wherein the LCD panel is accommodated to the front cover.

7. The display apparatus according to claim 1, wherein the four corners of the LCD frame are rectangularly recessed.

8. The display apparatus according to claim 1, further comprising a base disposed below a lower portion of at least one of the front cover and the rear cover.

9. The display apparatus according to claim 1, further comprising a base coupled to at least one of a lower portion of the front cover, a lower portion of the rear cover and an LCD module having the LCD panel and the LCD frame.

10. The display apparatus according to claim 1, wherein the sides of the front cover partially surround the sides of the rear cover when the front cover and the rear cover are combined.

11. A display apparatus, comprising:
    an LCD panel;
    a front cover located in front of the LCD panel;
    a rear cover assembly located behind the LCD panel;
    an LCD frame surrounding the LCD panel at a periphery thereof and including a plurality of corner combining holes formed at four corners of the LCD frame and combined to edges of at least one of the front cover and the rear cover, the four corners of the LCD frame being recessed with thin thickness; and
    a base disposed below a lower portion of the display apparatus,
    wherein the front cover surrounds the LCD frame and the rear cover when the front cover and the rear cover are combined.

12. The display apparatus according to claim 11, wherein the rear cover is combined to the LCD frame through the corner combining holes.

13. The display apparatus according to claim 11, wherein the four corners of the LCD frame are rectangularly recessed.

14. The display apparatus according to claim 11, wherein the base is disposed below a lower portion of at least one of the front cover and the rear cover.

15. The display apparatus according to claim 11, wherein the base is coupled to at least one of a lower portion of the front cover, the rear cover and the LCD frame.

16. The display apparatus according to claim 11, wherein the front cover and the rear cover respectively include sides, and the sides of the front cover overlap the sides of the rear cover when the front cover and the rear cover are combined.

17. The display apparatus according to claim 16, wherein the sides of the front cover partially overlap the sides of the rear cover when the front cover and the rear cover are combined.

* * * * *